United States Patent
Bogdahn et al.

(10) Patent No.: US 9,420,765 B2
(45) Date of Patent: Aug. 23, 2016

(54) PLUG-IN LOCK FOR CONNECTING LINE ELEMENT AND AN ANIMAL TETHER WITH SUCH A PLUG-IN LOCK

(71) Applicant: flexi-Bogdahn Technik GmbH & Co. KG, Bargteheide (DE)

(72) Inventors: Manfred Bogdahn, Hamburg (DE); Essaid Dib, Hamburg (DE)

(73) Assignee: flexi-Bogdahn Technik GmbH & Co. KG, Bargteheide (DE)

( * ) Notice: Subject to any disclaimer, the term of this patent is extended or adjusted under 35 U.S.C. 154(b) by 279 days.

(21) Appl. No.: 14/025,432

(22) Filed: Sep. 12, 2013

(65) Prior Publication Data
US 2014/0196672 A1    Jul. 17, 2014

(30) Foreign Application Priority Data

Jan. 16, 2013    (DE) .......................... 10 2013 000 590

(51) Int. Cl.
| | |
|---|---|
| A01K 27/00 | (2006.01) |
| A44B 11/25 | (2006.01) |
| A44B 11/26 | (2006.01) |

(52) U.S. Cl.
CPC ............ *A01K 27/005* (2013.01); *A01K 27/003* (2013.01); *A44B 11/2596* (2013.01); *A44B 11/263* (2013.01); *Y10T 24/45225* (2015.01)

(58) Field of Classification Search
None
See application file for complete search history.

(56) References Cited

U.S. PATENT DOCUMENTS

| | | | | |
|---|---|---|---|---|
| 4,416,037 A | * | 11/1983 | Panthofer et al. | ............... 24/665 |
| 2009/0070973 A1 | | 3/2009 | Nguyen | |

FOREIGN PATENT DOCUMENTS

| | | | | |
|---|---|---|---|---|
| DE | 30 26 418 C2 | 12/1982 | | |
| DE | 10 2005 031522 A1 | 1/2007 | | |
| DE | 699 33 306 T2 | 4/2007 | | |
| DE | 11 2008 000099 T5 | 11/2009 | | |
| FR | 1 066 710 A | 6/1954 | | |
| GB | 2 079 359 A | 1/1982 | | |
| JP | H01122350 U | 8/1989 | | |
| JP | H09-313235 A | 12/1997 | | |
| JP | H11-244008 A | 9/1999 | | |
| JP | 3107186 U | 1/2005 | | |
| JP | 3167227 U | 4/2011 | | |
| WO | WO2009141942 A1 | * | 11/2009 | ............... A43C 1/04 |
| WO | 2013/109587 A1 | 7/2013 | | |

OTHER PUBLICATIONS

Japanese Office Action of Apr. 6, 2015.

* cited by examiner

*Primary Examiner* — Jack W Lavinder
(74) *Attorney, Agent, or Firm* — McGlew and Tuttle, P.C.

(57) ABSTRACT

A plug-in lock (1) for connecting flexible and/or rigid line elements (43, 44) with a plug-in part (11) and a receiving part (12), whereby a positive-locking connection (14) is provided for transmitting a tensile force for establishing a detachable connection of the plug-in part (11) to the receiving part (12). In order to prevent an unintentional detaching of the connection of the plug-in part (11) from the receiving part (12) even at high tensile forces and at the same time to make possible a simple operability and cost-effective manufacture, the plug-in lock has a securing device (13, 25) separate from the positive-locking connection (14) for preventing an unintentional detaching of the positive-locking connection (14). The securing device (13, 25) has an actuating mechanism (33) for detaching the securing device (13, 25).

19 Claims, 11 Drawing Sheets

PLUG-IN LOCK FOR CONNECTING LINE ELEMENT AND AN ANIMAL TETHER WITH SUCH A PLUG-IN LOCK

CROSS REFERENCE TO RELATED APPLICATIONS

This application claims the benefit of priority under 35 U.S.C. §119 of German Patent Application DE 10 2013 000 590.6 filed Jan. 16, 2013, the entire contents of which are incorporated herein by reference.

FIELD OF THE INVENTION

The present invention pertains to a plug-in lock for connecting flexible and/or rigid line elements, especially of an animal tether, with a plug-in part and a receiving part, whereby a positive-locking connection is provided for transmitting a tensile force for establishing a detachable connection of the plug-in part to the receiving part.

BACKGROUND OF THE INVENTION

Such a plug-in lock is known from DE 11 2008 000 099 T5. In this case, the connection is established by means of holding heads arranged at flexible arms, which are associated with the plug-in part and lock in mounts of the receiving part.

The drawback in this case is that the flexible arms have a small cross section, on the one hand, for providing a spring mounting and, on the other hand, must absorb the entire tensile force in case of a tensile load of the plug-in lock. Thus, the flexible arms must perform a dual function. There is the risk in this case that, because of the elastic design of the flexible arms necessary for detaching the locking connection, these buckle or are broken under a sufficient tensile force, such that the plug-in part is unintentionally detached from the receiving part.

SUMMARY OF THE INVENTION

Therefore, a basic object of the present invention is to further develop a plug-in lock of the type mentioned in the introduction, such that an unintentional separation of the connection of the plug-in part from the receiving part is prevented even at higher tensile forces, whereby simple operability and cost-effective manufacture are made possible at the same time.

A basic object of the present invention is accomplished by a plug-in lock of the type mentioned in the introduction, whereby a securing means that is separate from the positive-locking connection is provided for preventing an unintentional detaching of the positive-locking connection, whereby the securing means has an actuating mechanism for detaching the securing means.

It is advantageous in this case that a separate securing means is provided in addition to the positive-locking connection. The securing means preferably establishes a connection between the plug-in part and the receiving part. The risk of an unintentional separation of the connection of the plug-in part to the receiving part can be markedly reduced as a result of this. The separate securing means is preferably used as an additional locking connection to prevent an unintentional detaching of the connection, which is especially positive locking, of the plug-in part to the receiving part. The securing means is especially used exclusively for securing the positive-locking connection to prevent an unintentional separation of the positive-locking elements establishing the positive-locking connection. Herein, the securing means preferably does not take up any forces that form during a tensile load of the plug-in lock. All forces or a large part of the forces during a tensile load of the plug-in lock are preferably taken up and/or passed on by the positive-locking connection. The securing means is, in particular, spaced apart from the positive-locking connection. Thus, the securing means is not integrated into the positive-locking connection, for example. Because of a spatial and/or functional separation of the securing means from the positive-locking connection, the operability can be improved. A more reliable connection of the plug-in part to the receiving part is preferably achieved because of the spatial separation. In particular, the connection of the plug-in part to the receiving part can only be detached by a simultaneous, preferably spatially and/or functionally separate, actuation of the plug-in lock for separating the connection being formed by the securing means, on the one hand, and the positive-locking connection, on the other hand. The securing means especially has an independent actuating mechanism, which is separate in relation to the positive-locking connection. Preferably, at first the securing means must be detached by means of the actuating mechanism for separating the plug-in part from the receiving part. Finally, the positive-locking connection can also be detached because of the detached securing means. The connection of the plug-in part to the receiving part can preferably be exclusively established and/or detached with a simultaneous establishing and/or separation of securing means and of the positive-locking connection.

Furthermore, it is advantageous that a positive-locking connection of the plug-in part to the receiving part is provided for taking up and/or passing on a tensile force acting on the plug-in lock. The components of the positive-locking connection are preferably designed as rigid. As a result of this, the positive-locking connection can be designed as stronger and thus can take up higher tensile forces than a locking connection with, for example, an elastic locking element. The plug-in part and/or the receiving part can selectively be connected to any add-on part instead of a line element.

According to another embodiment, two positive-locking elements, which correspond to one another and have a rigid design, in particular, are provided for the positive-locking connection. Because of a rigid design of the positive-locking elements, the plug-in lock is able to take up and/or pass on high tensile forces, and especially of more than 1,000 N, preferably of at least 1,500 N, and especially preferably of at least 2,500 N. There is no risk in this case of an unintentional detaching of the positive-locking connection because of high tensile forces. The plug-in part preferably has a first positive-locking element, and in particular a rigid axial element, and the receiving part has a second positive-locking element, and especially a rigid axial element mount, for cooperating with the first positive-locking element. A rigid and yet detachable connection forms because of a connection of the first positive-locking element to the second positive-locking element.

The two positive-locking elements can be connected to one another in a direction transversely, and especially at right angles, to the longitudinal alignment of the plug-in lock and/ or transversely, and especially at right angles, to the pulling direction of a tensile force acting on the plug-in lock during the intended use. The two positive-locking elements can preferably be inserted into one another for establishing the positive-locking connection. In particular, the two positive-locking elements can be connected to one another in a direction transversely, preferably at right angles, to the longitudinal alignment of the line elements to be connected to one another. Consequently, it can be guaranteed that the positive-locking connection cannot be unintentionally detached in case of a tensile load of the plug-in lock during the intended use. Preferably, a mounting direction is aligned for connecting and/or separating the two positive-locking elements transversely, and especially at right angles, to at least one component of the tensile force during a tensile load of the plug-in lock. The first positive-locking element can be inserted into the second positive-locking element and/or can be passed at least partly through an opening in a side wall of the receiving part. With an at least partial passing of the first positive-locking element through an opening, a raised area projecting over the side wall is especially produced. As a result of this, the establishing of a reliable positive-locking connection and/or interlocking is favored.

According to a variant, the two positive-locking elements have a self-centering and/or self-securing design under tensile load. In particular, for forming this self-centering and/or self-securing design, the first positive-locking element has at least one notch and the second positive-locking element has at least one projection designed corresponding to the notch. The notch and projection are preferably arranged such that they cooperate with one another and/or mesh with one another under a tensile load of the plug-in lock. In the positive-locking connection, the notch may extend at least partly behind the projection. Especially under a tensile load of the plug-in lock, the risk of unintentional detaching of the positive-locking connection is further reduced because of the notch of the first positive-locking element extending behind the second positive-locking element.

According to another embodiment, the plug-in part and/or the first positive-locking element in the positive-locking connection has an area which is offset inwardly in relation to the receiving part for providing a depression and/or an area which is offset outwardly for providing a raised area. Because of the depression and/or the raised area, the operability and/or manageability of the plug-in lock is improved, especially when establishing and/or separating the connection of the plug-in part to or from the receiving part. Especially in combination with the raised area arranged facing away from the depression, intuitive operation arises for the user. When establishing the connection of the plug-in part to the receiving part, the user receives, because of the forming raised area and/or depression, a feedback with regard to a correctly established connection. When separating the connection, the raised area and/or depression leads the user to push the plug-in part sideways out of the receiving part.

Preferably, the securing means, especially as a separate locking connection for the purely positive-locking connection, has at least one elastically and/or spring mounted first locking element, which cooperates with an especially rigid, second locking element designed as corresponding to the first locking element for establishing the securing means. The manufacture and providing of such locking elements can be done cost-effectively and makes possible a connection in addition to the positive-locking connection, especially for preventing an unintentional separation of the positive-locking connection. The first locking element is preferably associated with the plug-in part and the second locking element is preferably associated with the receiving part.

According to a variant, the securing means and/or positive-locking connection can be established by an at least partial telescoping or fitting into one another of the plug-in part into the receiving part in a direction transversely to the longitudinal alignment of the plug-in lock and/or transversely to a pulling direction of a tensile force acting on the plug-in lock during the intended use. The motion of inserting the plug-in part into the receiving part especially has a component directed at right angles to the longitudinal alignment of the plug-in lock and/or to a pulling direction of a tensile force acting on the plug-in lock during the intended use. Thus, there is just no motion essentially in the direction of the longitudinal alignment of the plug-in lock or in the pulling direction during a tensile load of the plug-in lock for establishing and/or separating the connection of the plug-in part to the receiving part. Consequently, a positive-locking connection can be established, which guarantees a secure fastening of the plug-in part to the receiving part during a tensile load of the plug-in lock.

According to another embodiment, a fastening element for fastening an end of a line element is provided within the plug-in part, and especially in an area facing towards the receiving part. The fastening element may be designed as a rigid pin, a rigid axis or a rigid axial section about which the line element can be led. Preferably, the fastening element can be fastened, especially locked, in a fastening mount associated with the first positive-locking element. The fastening element may be detachable from the fastening mount. As an alternative, the fastening element may be a part and/or an extension of the first positive-locking element. Preferably, the fastening element is arranged within the plug-in part, such that the end of the line element, especially a sewn area of the end, is arranged within the plug-in part and/or is covered by the plug-in part.

The plug-in part and/or the actuating mechanism preferably has at least one elastically mounted actuating element, especially a pressing surface. The actuating element may be used for detaching the securing means. In particular, the first locking element can be moved by means of the actuating element out of an active position, in which the first locking element cooperates with the second locking element. The actuating element is preferably connected to the first locking element for detaching the securing means and/or the locking connection of the first locking element to the second locking element. Thus, the first locking element is elastically mounted because of the, especially one-piece, connection to the actuating element. The force needed for separating the connection of the plug-in part from the receiving part by means of an actuation of the actuating element is preferably at most 50 N, and especially at most 30 N.

According to a variant, the plug-in part has a contact surface that is in contact with a contact web of the receiving part in case of a connection of the plug-in part to the receiving part. The contact surface and/or the contact web is preferably associated with the side with the opening for the partial passing through of the first positive-locking element and/or raised area. The direction of insertion of the plug-in part into the receiving part is preferably predetermined based on the contact web.

According to another embodiment, a ramp is associated with the first locking element and/or with the second locking element for leading the first locking element into a position for establishing the securing means, especially as a locking connection. Establishing the connection of the plug-in part to the receiving part is simplified as a result of this. In particular, the actuation of an actuating mechanism and/or of an actuating element is only necessary for separating the plug-in part from the receiving part. When the plug-in part is inserted into the receiving part, the first locking element preferably jumps into its locking position, which is perceptible and audible to the user. As a result of this, the user receives a clear feedback whether the desired connection and/or securing means is established.

Especially advantageous is an animal tether with a plug-in lock according to the present invention with a leash, whereby a first end of the leash is associated with a holding means for holding the leash and a second end of the line facing away from the first end is associated with the plug-in part. Such animal tethers may be designed for holding and/or leading dogs or cats. The holding means may be designed as a simple holding strap or as a gripping means, especially for rolling up and unrolling the leash. In this case, the leash is provided as a first, preferably flexible, line element. The leash and/or the flexible line element may be designed as a belt, a band, a chain and/or a cable. A second line element or an add-on part is preferably associated with the receiving part at an end facing away from the plug-in part. The second line element may be designed as a bite belt and/or a collar loop for an animal.

According to an alternative embodiment, also conceivable independently of the present invention, an animal tether or a leash is provided with a bite belt, whereby the bite belt can be connected to the animal tether or leash by means of a quick-action coupling. It is advantageous in this case that the bite belt can be connected to the leash, can be detached from the leash and/or can be replaced in a simple and quick manner. In particular, a first end of the bite belt can be connected to the leash by means of the quick-action coupling and a second end of the bite belt facing away from the first end is provided for connecting the leash and/or bite belt to a collar loop for an animal. Preferably, the second end has a second quick-action coupling. The quick-action coupling is preferably designed for connecting the bite belt to the animal tether or leash according to the plug-in lock according to the present invention.

Because of the plug-in lock according to the present invention, a reliable and secure connection of the plug-in part to the receiving part can be guaranteed even at high tensile forces, especially when holding and/or leading dogs. At the same time, a simple operability is achieved, as a result of which a replacement of a bite belt or of another add-on part is especially made easier. In addition, the end of the first line element is arranged within the plug-in part. As a result of this, for example, a seam, which forms during the displacing and sewing of the end for establishing a loop for fastening the first line element, can be covered in a simple manner. Additional seam coverings are thus unnecessary. Moreover, compact types of construction can be produced especially because of the arrangement of the fastening element within the plug-in part and/or the plug-in lock. In particular, essentially pressure forces act on the positive-locking elements via the fastening element. This is especially advantageous, for example, for the durability of a plug-in lock made of plastic.

The plug-in part and/or receiving part can preferably be manufactured in one piece, especially as an injection-molded plastic part. A manufacture from plastic, especially as an injection-molded plastic part, makes possible a cost-effective manufacture. The weight of the plug-in lock may be less than 15 g, especially at most 10 g, and especially preferably at most 6 g. Preferably, the maximum width of the plug-in lock is in a range of 26 mm to 28 mm, and especially in case of a second line element with a width of 20 mm associated with the receiving part. According to another embodiment, the maximum width of the plug-in lock is in a range of 18 mm to 20 mm, especially in case of a second line element with a width of 14 mm associated with the receiving part.

The present invention is explained in detail below based on the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
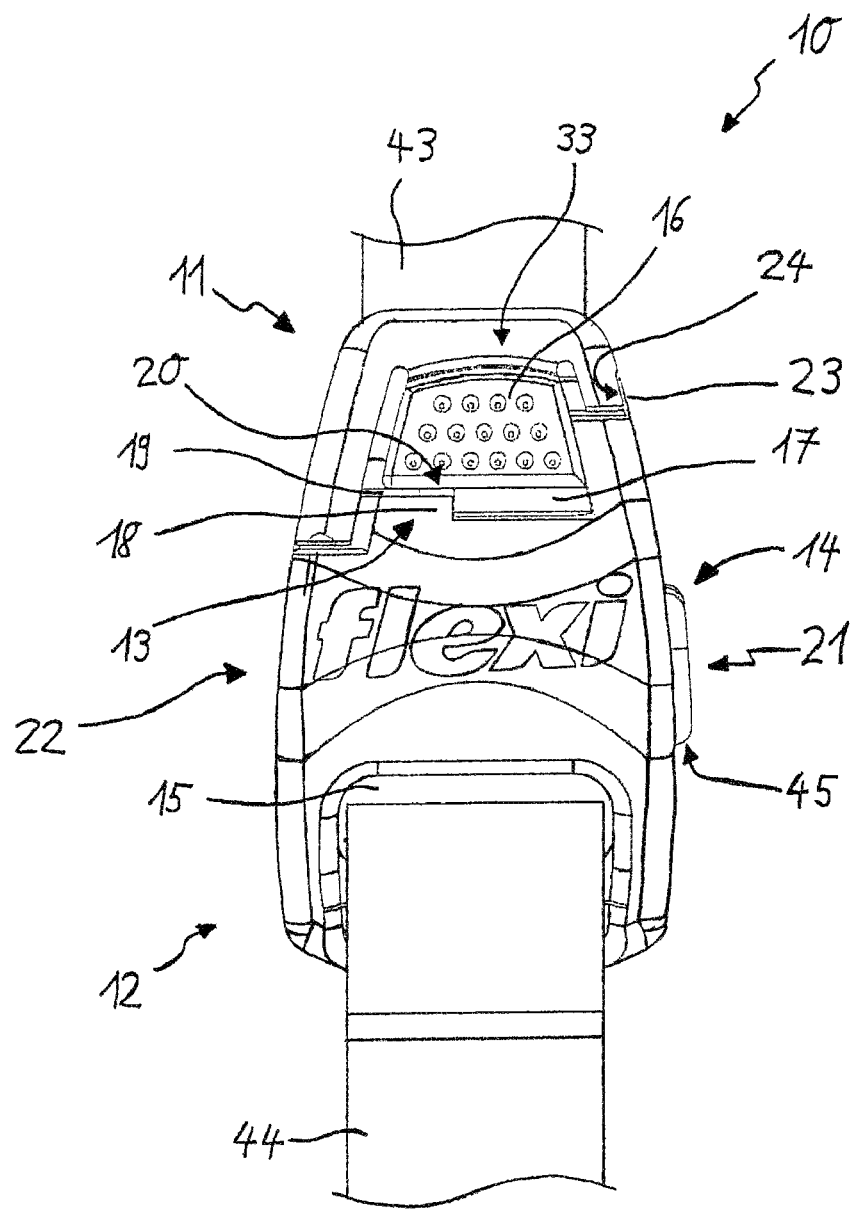
FIG. 1 is a front view of a plug-in lock according to the present invention.

Referring to the drawings in particular, FIG. 1 shows a front view of a plug-in lock 10 according to the present invention. Plug-in lock 10 comprises a plug-in part 11 and a receiving part 12. As will still be explained in detail below, the plug-in part 11 and the receiving part 12 are detachably connected to one another by means of a positive-locking connection 14 and to the positive-locking connection 14 by means of a separate securing means 13. In this exemplary embodiment, the securing means 13 is designed as a separate locking connection 13, which is spaced apart or separated from the positive-locking connection 14. In this exemplary embodiment, the locking connection 13 and the positive-locking connection 14 are arranged spaced apart from one another in the longitudinal direction of the plug-in lock 10.

Plug-in part 11 is provided for connecting to a first line element 43. In this exemplary embodiment, the first line element 43 is flexible, in particular designed as a leash, especially a cable or a belt, for holding an animal. The receiving part 12 has an opening or eyelet 15 at its end facing away from the plug-in part 11. The eyelet 15 is provided for fastening a second line element 44 or another add-on part. In this case, the second line element 44 is also flexible and is designed as a bite belt or a collar loop for an animal.

During the use of the plug-in lock 10 with first and second line elements 43, 44 arranged thereon, a tensile force acts on the plug-in lock 10 at least partly in the direction of the longitudinal alignment of the plug-in lock 10 or from the plug-in part 11 in the direction of the receiving part 12 and/or from the receiving part 12 in the direction of the plug-in part 11.

The locking connection 13 comprises an actuating mechanism 33. First, the locking connection 13 and thus also the positive-locking connection 14 can be separated because of a manual actuation of the actuating mechanism 33. The actuating mechanism 33 comprises in this exemplary embodiment an actuating element 16. The actuating element 16 is associated with the plug-in part 11 and in this exemplary embodiment is designed as an elastically mounted push-button. The actuating element 16 can be pressed at least partly into the plug-in part 11 to detach the locking connection 13. A first locking element 17, which can be pressed into the plug-in part 11 together with actuating element 16, is associated with the actuating element 16. The first locking element 17 is facing towards the receiving part 12. Moreover, first locking element 17 cooperates with a second locking element 18 which is associated with receiving part 12 and is designed as rigid in this exemplary embodiment. In the locking connection 13, the second locking element 18 which has a projection-like design in the direction of plug-in part 11 meshes with a recess 20 formed by means of the first locking element 17, an edge of the actuating element 16 and an inner side of a web 19. Web 19 is associated with the plug-in part 11 in this case and the inner side of the web 19 is facing towards an end of the first locking element 17. Because of the locking connection 13, an unintentional detaching of the connection, and especially of the positive-locking connection 14, between the plug-in part 11 and the receiving part 12 is prevented.

The plug-in part 11 has a first positive-locking element 21. In the exemplary embodiment shown, the first positive-locking element 21 is designed as a rigid axial element 21. The first positive-locking element 21 cooperates with a second positive-locking element 22 not recognizable in detail in this figure. The second positive-locking element 22 in this exemplary embodiment is designed as an axial element mount 22 designed as corresponding to the cross section of the axial element. In this case, the axial element mount 22 has a duct-like design and extends from a first side wall of the receiving part 12 to a second side wall of the receiving part 12 facing away from the first side wall. In this case, the side walls have openings designed as corresponding to the axial element mount 22 and the axial element 21. In the established connection of the plug-in part 11 to the receiving part 12, the first positive-locking element 21 stands to a certain extent, in this exemplary embodiment approximately 1 mm, above the side wall, which is associated with a contact web 23 of the receiving part 12, through the opening of the second positive-locking element 22 in the outward direction for forming a raised area 45.

The contact web 23 of the receiving part 12 extends away from the eyelet 15 and/or in the direction of the plug-in part 11. The contact web 23 is associated with the side of the receiving part 12 with the raised area 45. In this case, the second positive-locking element 22 is arranged approximately in the middle between the contact web 23 and the eyelet 15 and transversely, in this case at right angles, to the longitudinal alignment of the plug-in lock 10. In the connection of the plug-in part 11 to receiving part 12, an inner surface of the contact web 23 facing towards the plug-in part 11 is in contact with a contact surface 24 of the plug-in part 11 directed outwardly.

Figure 2:
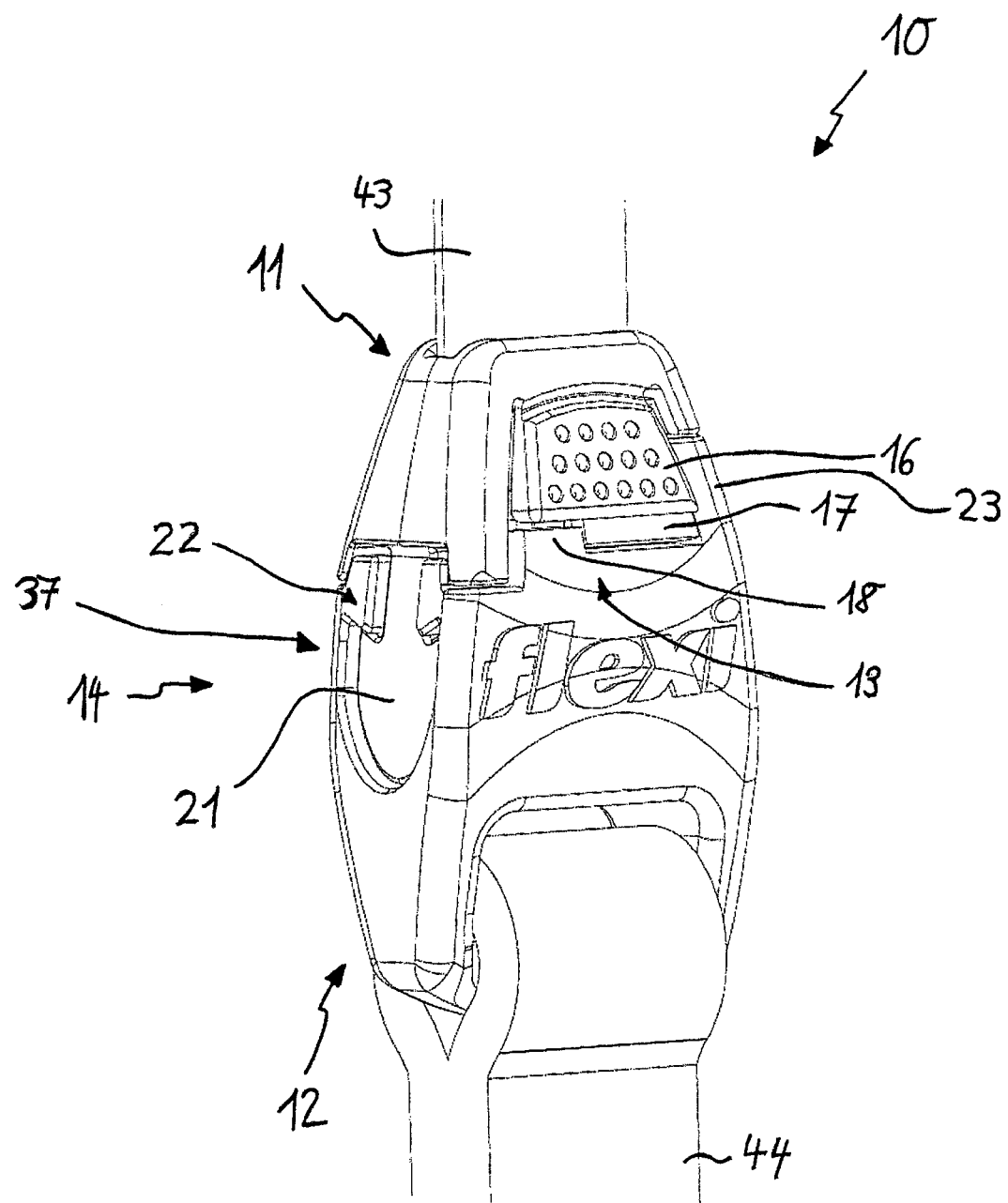
FIG. 2 is a perspective view of the plug-in lock according to the present invention.

FIG. 2 shows a perspective view of the plug-in lock 10 according to the present invention. Herein, the side of the plug-in lock 10 facing away from the contact web 23 is shown. The first positive-locking element 21 is positive locking and is pushed into the second positive-locking element 22 from the side facing away from the contact web 23 in the direction of the side of the receiving part 12 with the contact web 23.

On the side facing away from contact web 23, plug-in lock 10 has a depression 37. The depression 37 is formed with an established connection of the plug-in part 11 to the receiving part 12 because of an end of the first positive-locking element 21 moved into the interior of the receiving part 12 or of the second positive-locking element 22. A first end of first positive-locking element 21 designed in this case as axial element 21 is designed as the raised area 45, not recognizable in this case, in the established connection. A second end of axial element 21 facing away from the first end forms the depression 37. In the area of depression 37, the receiving part 12 stands above the depression 37 in the outward direction. As a result of this, the outer side of depression 37 or the second end of the first positive-locking element 21 is offset inwardly in relation to the receiving part 12 in the plug-in lock 10.

Figure 3:
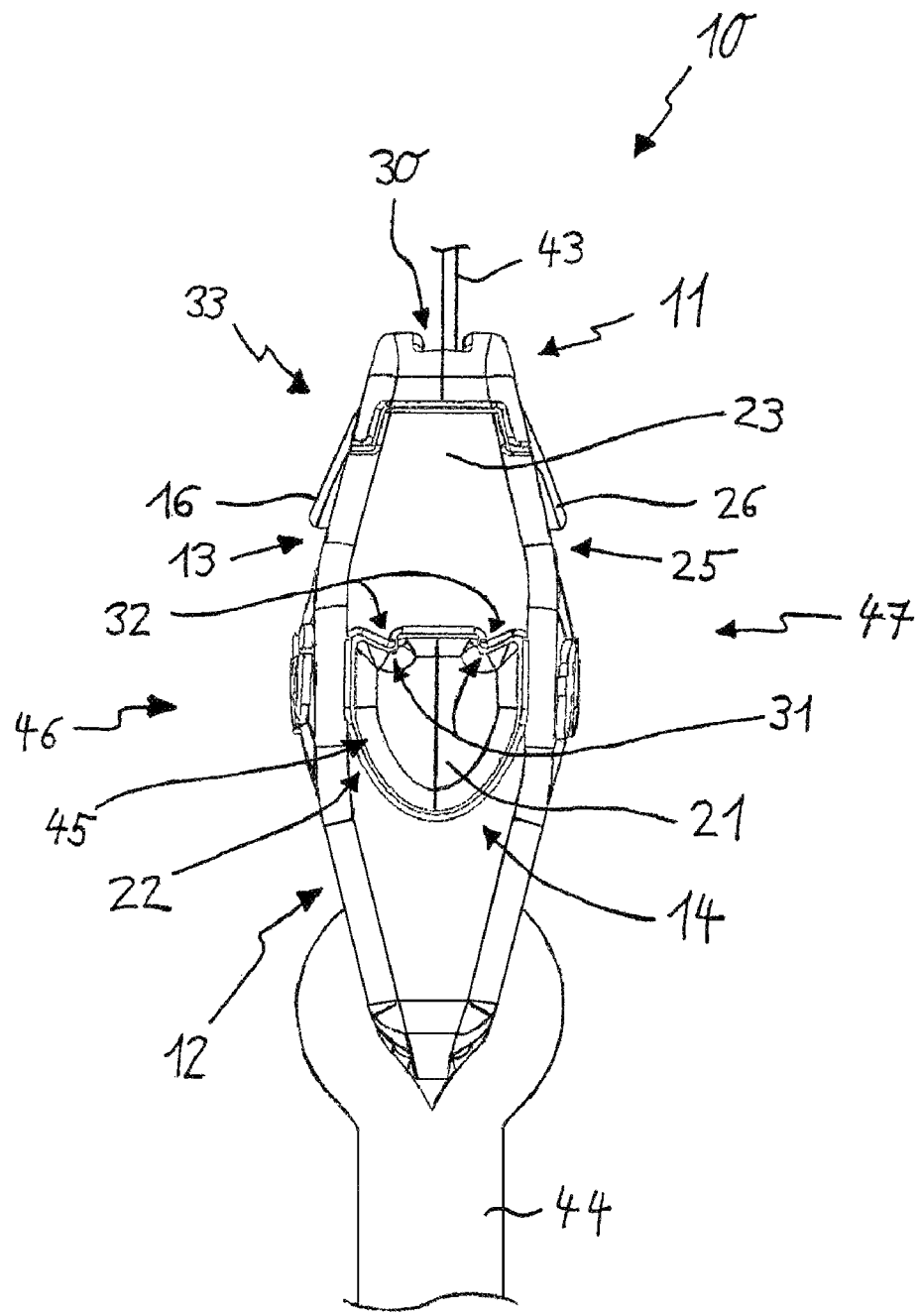
FIG. 3 is a side view of the plug-in lock according to the present invention.

FIG. 3 shows a side view of the plug-in lock 10 according to the present invention. In this case, the side or the side wall with the contact web 23 is shown. This view shows that the plug-in part 11 has an opening on a side facing away from the receiving part 12. The opening is provided for inserting the first line element 43 into the plug-in part 11.

The plug-in lock 10 has a first front 46, which is shown in detail according to FIG. 1. The view according to FIG. 3 now shows that the plug-in lock 10 has a second front 47 facing away from the first front 46. The first front 46 and the second front 47 of the plug-in lock 10 are designed as mirror-symmetrical in this exemplary embodiment. To this extent, reference is made to the above description. Because of the mirror-symmetrical design, the second front 47 has another detachable securing means 25, which in this exemplary embodiment is designed as a locking connection 25 and which corresponds to the locking connection 13 in structure and function.

Thus, in this exemplary embodiment, the actuating mechanism 33 comprises an additional actuating element 26, which is associated with the plug-in part 11 and is designed as an elastically mounted push-button in this exemplary embodiment. The actuating element 26 can be at least partly pressed into the plug-in part 11 to detach the locking connection 25.

The actuating elements 16, 26 rise at least partly above the outer surface of plug-in part 11 and/or of the receiving part 12 in this exemplary embodiment.

The positive-locking parts 21, 22 have a self-centering and/or self-securing design under tensile load, in particular with a tensile force on the first line element 43 and the second line element 44 at least partly in the direction of the longitudinal alignment of the plug-in lock 10 or from the plug-in part 11 in the direction of the receiving part 12 and/or from the receiving part 12 in the direction of the plug-in part 11. For this, the cross section of the first positive-locking part 21 has an essentially U-shaped outer contour in this exemplary embodiment. The first positive-locking element 21 has two notches 31 on a side facing towards the opening 30. Two correspondingly designed projections 32 of the second positive-locking element 22 mesh with the notches 31 in the positive-locking connection 14. The contour of the second positive-locking element 22 corresponds to the outer contour of the first positive-locking element 21.

With a tensile force with at least one component in the direction of the longitudinal alignment of the plug-in lock 10 or from the plug-in part 11 in the direction of the receiving part 12 and/or from the receiving part 12 in the direction of the plug-in part 11, the first positive-locking element is centered automatically because of the cooperation of the notches 31 with the projections 32 in relation to the second positive-locking element 22. Furthermore, with a tensile load the projections 32 slip at least partly above the notches 31 or the notches 31 extend at least partly behind the projections 32, as a result of which the positive-locking connection 14 is additionally secured.

Figure 4:
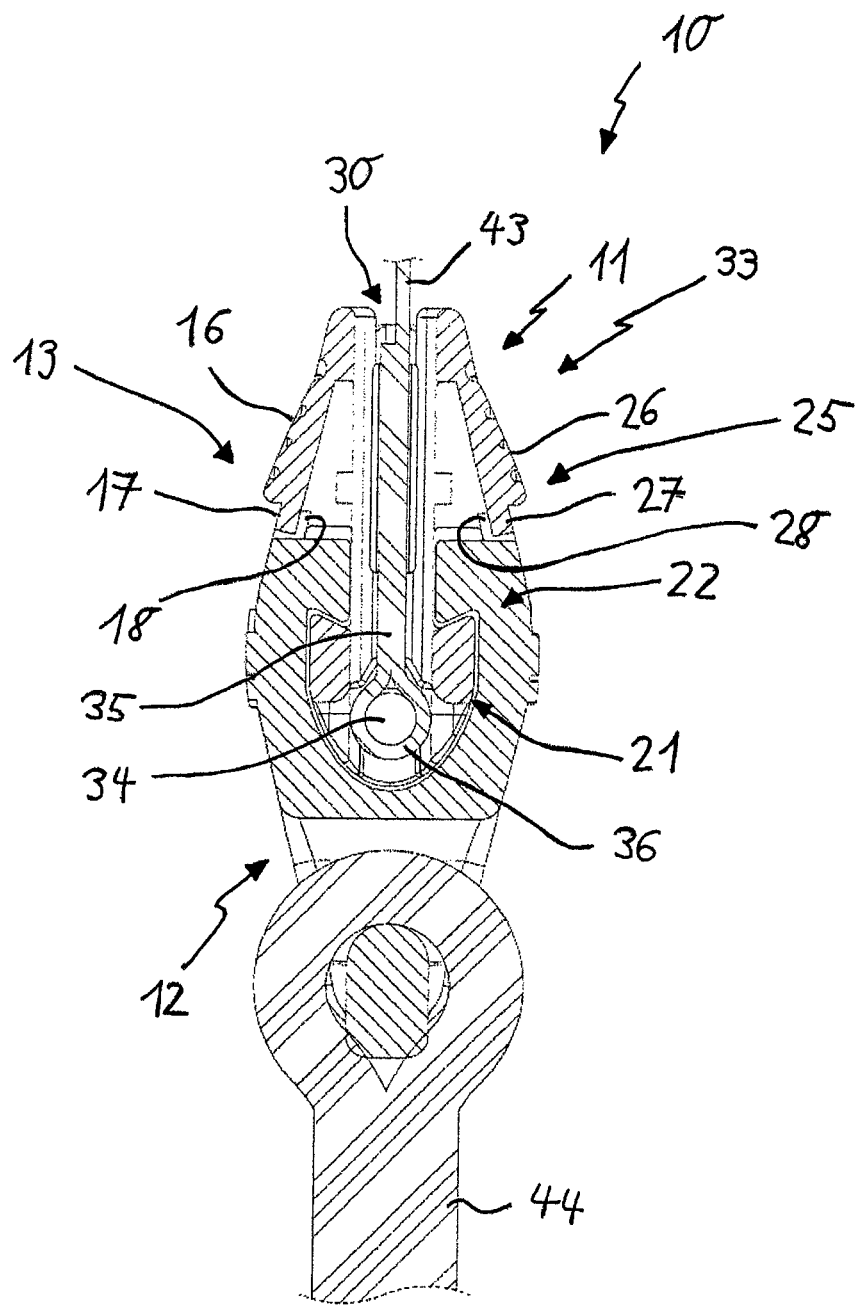
FIG. 4 is a cutaway side view of the plug-in lock according to the present invention according to FIG. 3.

FIG. 4 shows a cutaway side view of the plug-in lock according to the present invention according to FIG. 3. A first locking element 27, which can be pressed into the plug-in part 11 together with the actuating element 26, is associated with the actuating element 26. The first locking element 27 is facing towards the receiving part 12. Furthermore, the first locking element 27 cooperates with a second locking element 28 which is associated with the receiving part 12 and is designed as being rigid in this exemplary embodiment. In the locking connection 13, the second locking element 28, which has a projection-like design, meshes with a recess 29 formed by means of the first locking element 27, an edge of the actuating element 26 and a web 19. In this case, the web 19 is associated with the plug-in part 11 and at least partly facing towards an end of the first locking element 27. Because of the locking connection 25, an unintentional detaching of the connection between the plug-in part 11 and receiving part 12 is prevented. Thus, the structure and function of the first locking element 27 and of the second locking element 28 correspond to the locking connection 25, and those of the first locking element 17 and of the second locking element 18 correspond to locking connection 13.

Moreover, FIG. 4 shows that the first positive-locking element 21 comprises a fastening element 34 for fastening an end 35 of the line element 43. In this exemplary embodiment, fastening element 34 is designed as a rigid pin 34 which is connected in a positive-locking manner to the first positive-locking element 21 and extends transversely, in this case essentially at right angles, to the longitudinal alignment of the plug-in lock 10. The end 35 of the first line element 43 is guided about the pin 34 for fastening the first line element 43 to the plug-in part 11. In this exemplary embodiment, the line element 43 forms a loop 36 revolving about the fastening element 34. The pin 34 is mounted within the first positive-locking element 21 and fastened. In this case, the pin 34 is aligned with regard to its longitudinal axis transversely, in this exemplary embodiment at right angles to the longitudinal alignment of plug-in lock 10 and parallel to the longitudinal alignment of the first positive-locking element 21. Thus, the fastening of the first line element 43 is displaced into the plug-in lock 10, in this exemplary embodiment approximately in the middle in the plug-in lock 10. As a result of this, with a tensile force, essentially pressure forces, which are conducted to the second positive-locking element 22 and finally into the second line element 44, act on the first line element 43 from the first positive-locking element 21. In addition, the displacement of the fastening of the first line element 43 or of the pin 34 into the area of the center of the plug-in lock 10 makes possible a more compact type of construction and/or a simple-to-produce covering of the seam, which is formed during the displacement of the first line element 43 about the pin 34 and the sewing of the displaced end of the first end of the first line element 43 to produce the loop 36.

Figure 5:
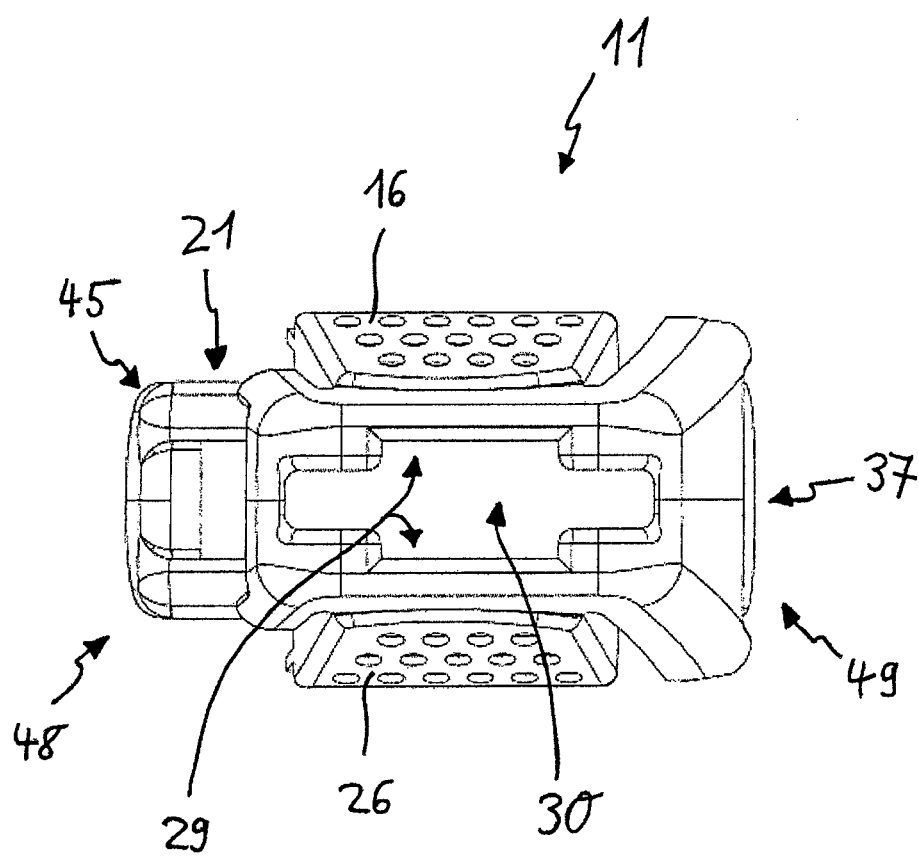
FIG. 5 is a top view of a plug-in part for the plug-in lock according to the present invention.

FIG. 5 shows a top view of a plug-in part 11 for the plug-in lock 10 according to the present invention. On a side of the plug-in part 11 facing away from a first end 48 of the first positive-locking element 21 with the raised area 45, the first positive-locking element 21 has the depression 37. The first end 48 of the first positive-locking element 21 thus protrudes above one side of the plug-in part 11, while the second end 49 of the first line element 21, facing away from the first end 48, is shifted into a side of the plug-in part 11 for forming the depression 37.

The opening 30 has an expansion 29 in a middle area. Because of the expansion 29, the opening 30 has a greater depth in the middle area than in the area of the two ends of the opening 30 facing away from one another. As a result of this, either a belt-like line element 43 or a cable-like line element 43 can be selectively led through the opening 30. In case of a belt-like line element 43, the width of the belt corresponds approximately to the maximum width of the opening 30. In case of a cable-like line element 43, the diameter of the cable corresponds approximately to the depth and/or width of the opening 30 in the area of the expansion 29.

Figure 6:
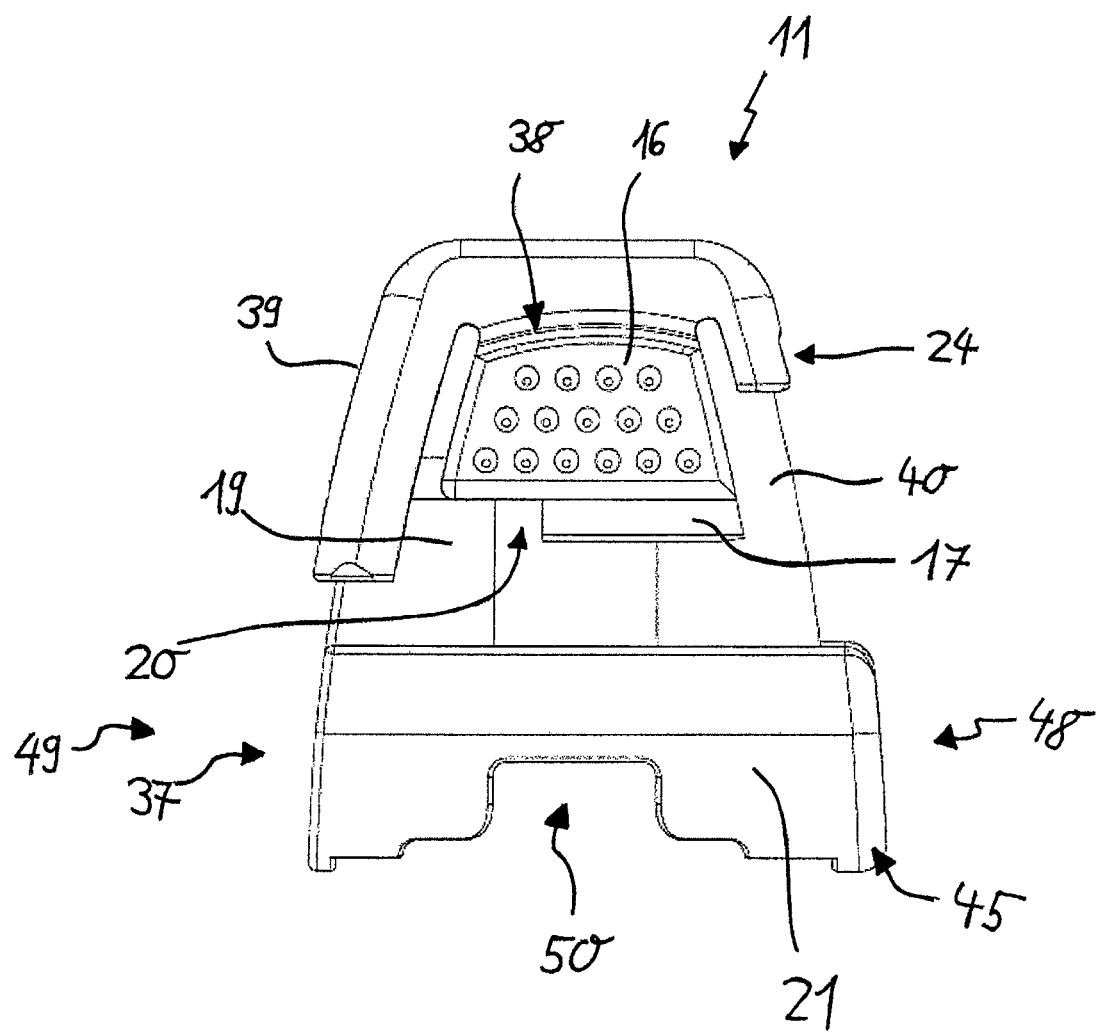
FIG. 6 is a front view of the plug-in part for the plug-in lock according to the present invention.

FIG. 6 shows a front view of a plug-in part 11 for the plug-in lock 10 according to the present invention. The direction of the view corresponds to the perspective view according to FIG. 1. The actuating element 16 has, just as the actuating element 26 not shown in detail, an elastic rotary connector 38 on a side facing away from the first locking element 17, 27. Because of elastic rotary connector 38, by means of which the actuating element 16, 26 is connected to the plug-in part 11, the actuating element 16, 26 and the first locking element 17, 27 connected to it can be pressed into the plug-in part 11. As soon as the actuating element 16, 26 is released, the actuating element 16, 26 and the first locking element 17, 27 automatically moves back into its starting position.

On a side facing away from the rotary connector 38 and facing towards the first positive-locking element 21, the first locking element 17, 27 is connected to the actuating element 16, 26. The first locking element 17, 27 has a web-like design and in this exemplary embodiment extends parallel to the longitudinal alignment of the first positive-locking element 21 or transversely, in this case at right angles, to the longitudinal alignment of the plug-in lock 10. An end of the first locking element 17, 27 facing away from a web 40 forms the recess 20 together with a web 19 facing towards this end and spaced apart from this end.

Furthermore, it is recognized that the contact surface 24 in this exemplary embodiment is designed as a recess. Moreover, the second end 49 of the first positive-locking element 21 or the outer side of the depression 39 is moved back inwardly in relation to an edge 39 adjacent to the actuating element 16, 26 and to the depression 39. The edge 39 extensively embraces the outer side of the web 19.

The additional web 40 is arranged on the side facing away from the edge 39 and facing towards the first positive-locking element 21. The additional web 40 has a structure that is extensively mirror-symmetrical to the web 19. The actuating element 16, 26 is fastened to the ends of the webs 19, 40 facing away from the first positive-locking element 21. The web 40 provides the contact surface 24 on its outer side. The outer side of the web 40 is largely exposed. Thus, an edge 39 comparable to the web 19 is just not provided in the web 40.

Furthermore, it is recognizable that the first positive-locking element 21 has a fastening mount 50 in an area facing away from the actuating elements 16 and facing towards the receiving part 12 in the connection to the receiving part 12, which is not shown. The fastening mount 50 is provided for receiving and fastening the fastening element 43 not shown in detail.

Figure 7:
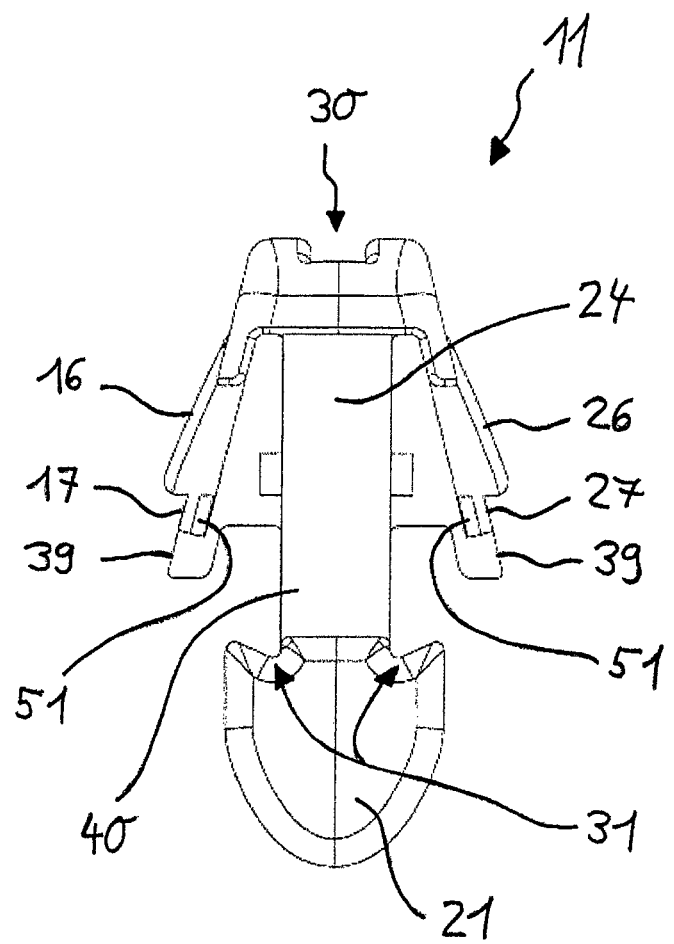
FIG. 7 is a side view of the plug-in part.

FIG. 7 shows a side view of the plug-in part 11 according to FIG. 6. The direction of the view corresponds to the perspective view according to FIG. 3. The exposed additional web 40 with the contact surface 24 directed outwardly is readily recognized. On the inner sides of the first locking elements 17, 27 is arranged a ramp 51 each, which have a slope sloping outwardly and towards the side.

Figure 8:
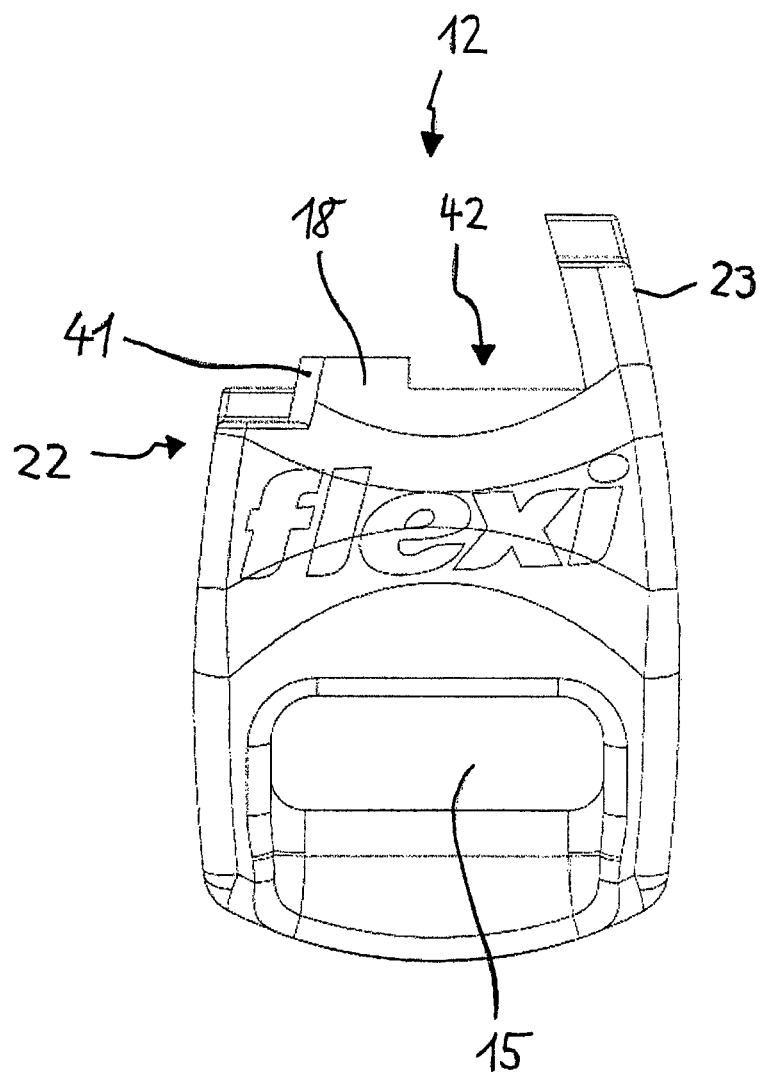
FIG. 8 is a front view of a receiving part for the plug-in lock according to the present invention.

FIG. 8 shows a front view of a receiving part 12 for the plug-in lock 10 according to the present invention. The direction of the view corresponds to the perspective view according to FIG. 1. Since the first front 46 is designed as mirror-symmetrical to the second front 47, the explanations of the first front 46 shown apply analogously also to the second front 47.

In this exemplary embodiment, a ramp 41 each extends starting from the second locking element 18, 28 in a direction facing away from the side with the second positive-locking element 22. Ramp 41 facilitates a sideways directed insertion of the plug-in part 11 transversely to the longitudinal alignment of the receiving part 12 and in the direction of the side with the contact web 23. For this, the ramp 41 cooperates with the ramp 51 of the plug-in part 11, whereby by means of the ramps 41, 51 the first locking element 17, 27 is moved out of the plug-in part 11 with the inserting motion of the plug-in part 11 directed transversely to the longitudinal alignment of the receiving part 12. As a result of this, a sliding of the first locking element 17, 27 over the second locking element 18, 28 is facilitated. As soon as the first locking element 17, 27 has completely slid over the second locking element 18, 28, the first locking element 17, 27 again moves back into its original starting position. In this case, the first locking element 17, 27 meshes with an additional recess 42 designed corresponding to the first locking element 17, 27, respectively. The width of the additional recess 42 is defined by a side of the second locking element 18, 28 facing towards the contact web 23 and a side of the contact web 23 facing towards the second locking element 18, 28.

Figure 9:
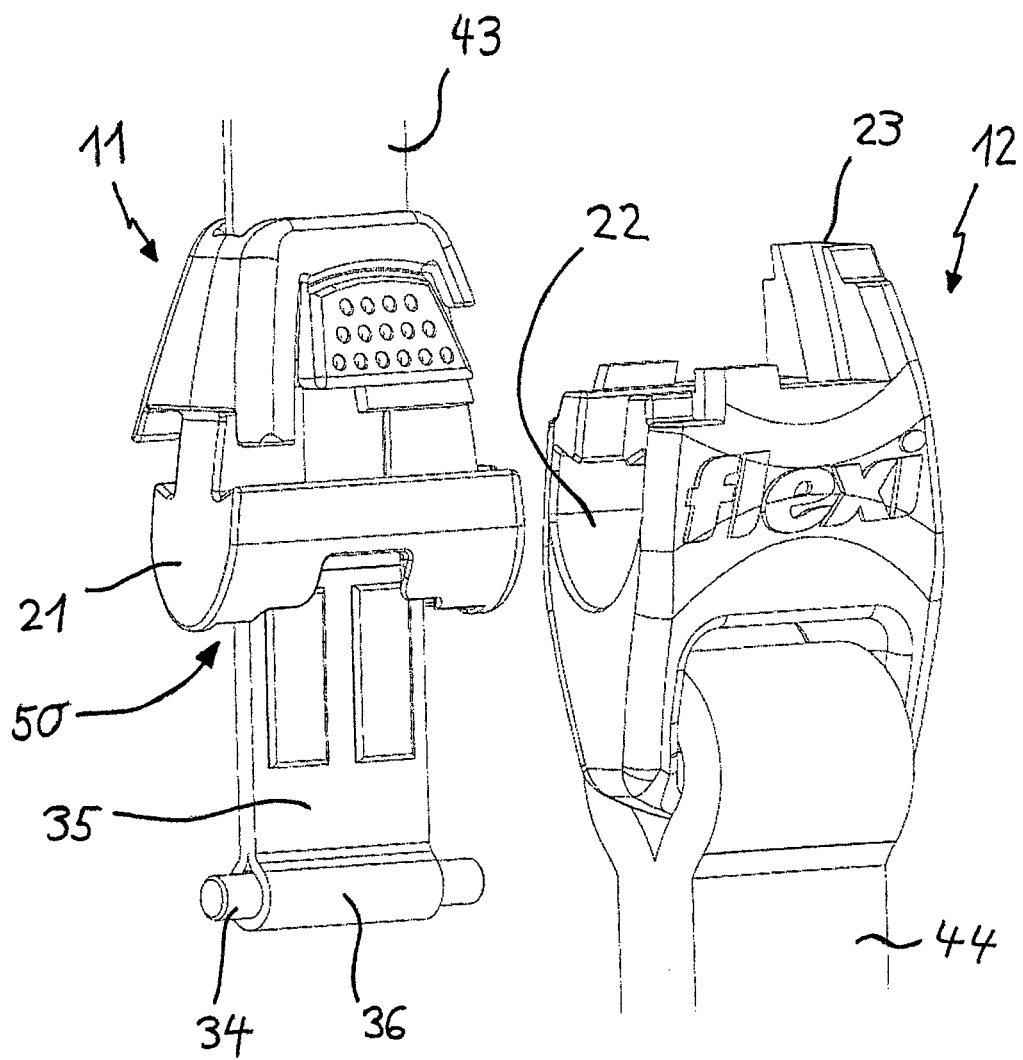
FIG. 9 is a first perspective view of the plug-in lock according to the present invention before establishing the connection.

FIG. 9 shows a first perspective view of the plug-in lock according to the present invention before establishing the connection. To connect the first line element 43 to the plug-in part 11, the fastening element 34 is inserted into the end 35 of the first line element 43 sewn to a loop 36. Then, the end 35 with the fastening element 34 is plugged into the fastening mount 50 of the plug-in part 11. In this case, the fastening element 34 can be fixed in the fastening mount 50 by means of a clip connection. As a result of this, a secure connection of the fastening element 34 and of the first line element 43 to the plug-in part 11 can be established.

Furthermore, it is recognized that the contact web 23 has an essentially U-shaped cross section, as a result of which the contact web 23 partly embraces the web 40 in the connection to the plug-in part 11.

Figure 10:
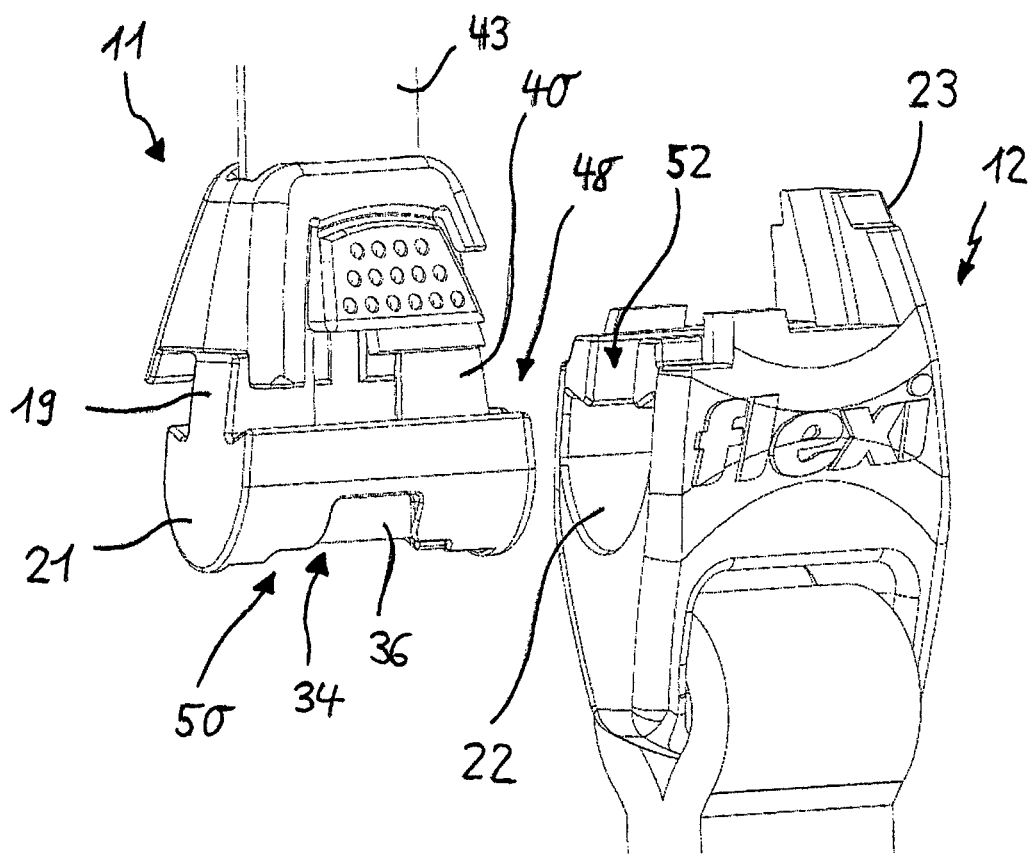
FIG. 10 is another perspective view of the plug-in lock according to the present invention before establishing the connection.

FIG. 10 shows another perspective view of the plug-in lock 10 according to the present invention before establishing the connection. In contrast to FIG. 9, the fastening element 34 is inserted and fastened in the fastening mount 50 in this case.

For establishing the connection of the plug-in part 11 to the receiving part 12, the plug-in part 11 is arranged on the side next to the receiving part 12, whereby the first positive-locking element 21 of the plug-in part 11 is located at the level of the second positive-locking element 22 of the receiving part 12.

The second positive-locking element 22 has a gap 52. The gap 52 is used for receiving and guiding at least a part of the webs 19, 40. To establish the connection, the first end 48 of the first positive-locking element 21 is inserted into an opening of the second positive-locking element 22 facing away from the contact web 23 and in the direction of the contact web 23.

Figure 11A:
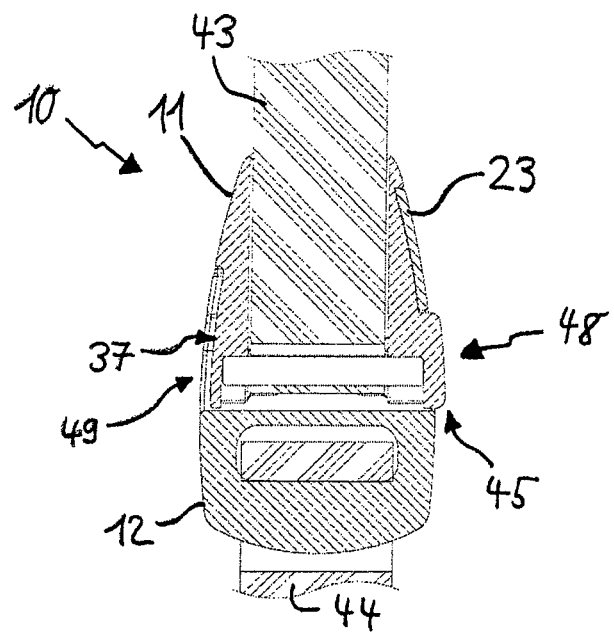
FIG. 11a is a cutaway front view of the plug-in lock according to the present invention.

FIG. 11a shows a first cutaway front view of the plug-in lock 10 according to the present invention. The connection of the plug-in part 11 to the receiving part 12 is completely established according to this view. In this case, the raised area 45 protrudes from the side of the receiving part 12 with the contact web 23. In this exemplary embodiment, the raised area protrudes by approximately 1 mm above the side surface of the receiving part 12. The second end 49 of the first positive-locking element 21 facing away from the first end 48 is shifted inwardly for forming the depression 37 opposite the side surface of the receiving part 12. In this exemplary embodiment, the depression 37 is approximately 1 mm deep.

Figure 11B:
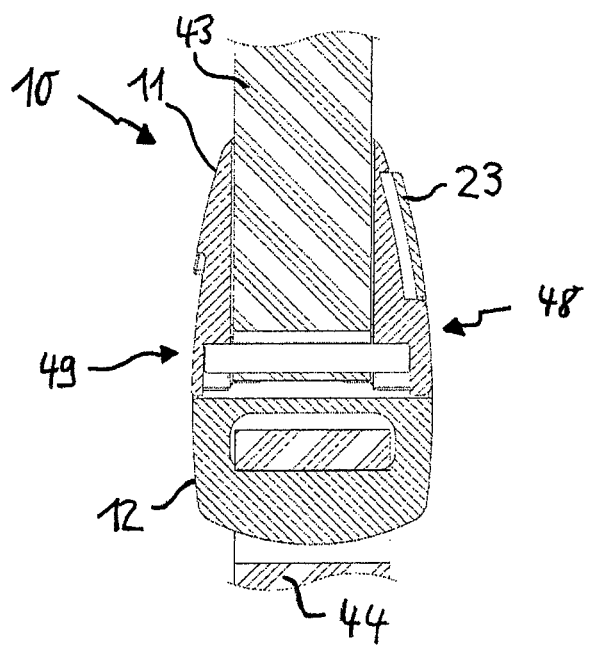
FIG. 11b is a cutaway front view of the plug-in lock according to the present invention.

FIG. 11b shows another cutaway front view of the plug-in lock 10 according to the present invention. According to this view, the connection of the plug-in part 11 to the receiving part 12 is incomplete. The first end of the first positive-locking element 21 lines up precisely with the outer side of the receiving part 12 with the contact web 23. The plug-in part 11 is displaced to the side opposite a secure connection according to FIG. 11a and away from the contact web 23. In this exemplary embodiment, an inner side of the contact web 23 is spaced apart from the web 40 of the plug-in part 11 by approximately 1 mm. The second end 49 of the first positive-locking element 21 lines up precisely with the side surface of the receiving part 12 facing away from the contact web 23. In this state, the locking connections 19, 25 are not yet completely established or just broken up again, such that a lateral pushing of the plug-in part 11 apart from the receiving part 12 is possible.

The present invention is explained in detail below on the basis of FIGS. 1 through 11:

If plug-in lock 10 is intended, for example, for an animal tether, a first end of a leash 43 is fastened to the plug-in part 11 with the fastening element 34. A bite belt or a collar loop for an animal, not shown in detail, is fastened to the receiving part 12 by means of the eyelet 15.

For establishing the detachable connection of the plug-in part 11 to the receiving part 12, the plug-in part 11 is inserted or pushed into the area of the side of the receiving part 12 facing away from the eyelet 15 sideways or transversely to the longitudinal alignment of the receiving part 12. For this, the side of the plug-in part 11 with the web 40 and with the first end 48 of the first positive-locking element 21 is moved from the side of the receiving part 12 facing away from the contact web 23 in the direction of the side with the contact web 23. In this case, the first locking elements 17, 27 are automatically pressed outwardly because of the ramps 41, 51, such that the first locking elements 17, 27 slide over the second locking elements 18, 28. In the locked position, first locking elements 17, 27 are received in the respective additional recess 42 and the second locking elements 18, 28 in the respective recess 20, as a result of which the locking connections 13, 25 are established. The locking of the first locking element 17, 27 in the locked position or the establishing of the locking connections 13, 25 is perceptible to the user. Thus, the user receives a corresponding feedback for a correct establishing of the positive-locking connection 14 and/or locking connections 13, 25. The feedback can be embodied by an audible locking and/or by a positioning that is detectable by feel. A feedback detectable by feel is also obtained by a raised area 45 projecting over the side and/or a depression 37.

Furthermore, in the locked position, the first positive-locking element 21 is plugged through the second positive-locking element 22, as a result of which the positive-locking connection 14 is established at the same time. Because of the locking connections 13, 25, an unintentional separation of the positive-locking connection 14 is prevented. For this, the locking connections 13, 25 are designed, such that they prevent an unintentional lateral displacement or a movement of the plug-in part 11 transversely to the longitudinal alignment of the receiving part 12 or of the plug-in lock 10 and in the longitudinal direction of the second positive-locking element 22.

In case of a load of the plug-in lock 10 because of a tensile force with at least one component in the longitudinal direction of the plug-in lock 10 or in the direction of a tensile force directed from the plug-in part 11 in the direction of the receiving part 12 and/or from the receiving part 12 in the direction of the plug-in part 11, the tensile force acting on the leash 43 is taken up by the fastening element 34 arranged approximately in the middle in the plug-in lock 10. In this case, the positive-locking connection 14 is fixed even further because of the self-centering by means of the notches 31 of the first positive-locking element 21 and the projections 32 of the second positive-locking element 22 and/or the self-securing means because of the notches 31 extending behind the projections 32.

For detaching the connection of the plug-in lock 10, first the actuating mechanism 33 is manually actuated. For this, the actuating elements 16, 26 are pressed inwardly at the same time, such that the plug-in part 11 can be moved sideways or transversely to the longitudinal alignment of the receiving part 12 in the direction away from the contact web 23. In this case, the first locking element 17, 27 are shifted inwardly, such that they slide under the second locking elements 18, 28. The actuating of the actuating mechanism 33 or the pressing together of the actuating elements 16, 26 is carried out with a first hand. With another hand, the raised area 45 and the depression 37 are detectable by feel. For detaching the positive-locking connection 14, the user is consequently intuitively led to press the raised area 45 laterally into the receiving part 12 and to press the depression 37 laterally out of the receiving part 12. Consequently, at first the state according to FIG. 11b is reached, in which the locking connections 13, 25 are detached and a pushing of the plug-in part 12 out of the receiving part 12 is made possible. Because of the locking connections 13, 25 separated in space apart from the positive-locking connection 14, a two-handed operation thus becomes necessary for separating the connection of the plug-in part 11 from the receiving part 12, as a result of which the risk of an unintentional separation is considerably reduced. In this case, the operation is designed as being simple to carry out.

While specific embodiments of the invention have been shown and described in detail to illustrate the application of the principles of the invention, it will be understood that the invention may be embodied otherwise without departing from such principles.

| List of Reference Numbers | |
| --- | --- |
| 10 | Plug-in lock |
| 11 | Plug-in part |
| 12 | Receiving part |
| 13 | Locking connection |
| 14 | Positive-locking connection |
| 15 | Eyelet |
| 16 | Actuating element |
| 17 | First locking element |
| 18 | Second locking element |
| 19 | Web |
| 20 | Recess |
| 21 | First positive-locking element |
| 22 | Second positive-locking element |
| 23 | Contact web |
| 24 | Contact surface |
| 25 | Locking connection |
| 26 | Actuating element |
| 27 | First locking element |
| 28 | Second locking element |
| 29 | Expansion |
| 30 | Opening |
| 31 | Notch |
| 32 | Projection |
| 33 | Actuating mechanism |
| 34 | Fastening element |
| 35 | Line element end |
| 36 | Loop |
| 37 | Depression |

-continued

| List of Reference Numbers | |
| --- | --- |
| 38 | Rotary connector |
| 39 | Edge |
| 40 | Web |
| 41 | Ramp |
| 42 | Additional recess |
| 43 | First line element |
| 44 | Second line element |
| 45 | Raised area |
| 46 | First front |
| 47 | Second front |
| 48 | First end |
| 49 | Second end |
| 50 | Fastening mount |
| 51 | Ramp |
| 52 | Gap |

What is claimed is:

1. A plug-in lock for connecting flexible and/or rigid line elements, the plug-in lock comprising:
a plug-in part;
a receiving part, the plug-in part and the receiving part forming a positive-locking connection for transmitting a tensile force;
a securing means separate from the positive-locking connection for preventing an unintentional detaching of the plug-in part and the receiving part to disconnect the positive-locking connection, whereby the securing means has an actuating mechanism for detaching the securing means, the positive-locking connection comprising a first positive-locking element and a second positive-locking element providing two rigid positive-locking elements corresponding to one another, whereby the plug-in part includes the first positive-locking element, and the receiving part includes the second positive-locking element cooperating with the first positive-locking element; and
a fastening element arranged within the plug-in part for fastening an end of a line element, whereby the fastening element is fastened in a fastening mount associated with the first positive-locking element for covering the fastening of the end of the line element, wherein the first positive-locking element comprises a first positive-locking rigid axial element, the first positive-locking rigid axial element comprising an opening, the fastening element, the end of the line element and at least a portion of the fastening mount being arranged in the opening, whereby the fastening element is arranged within the first positive-locking element.

2. A plug-in lock in accordance with claim 1, wherein at least one of the securing means and the positive-locking connection is established by an at least partial telescoping of the plug-in part into the receiving part, in a direction transversely at right angles to a longitudinal alignment of the plug-in lock or transversely to a pulling direction of a tensile force acting on the plug-in lock in use, whereby the first positive-locking element is inserted into the second positive-locking element and is led at least partly through an opening of a side wall of the receiving part for providing a raised area.

3. A plug-in lock in accordance with claim 1, wherein the two positive-locking elements have at least one of a self-centering and self-securing design under a tensile load, and the first positive-locking element comprises a notch and the second positive-locking element comprises a projection corresponding to the notch, whereby the notch extends at least partly behind the projection in the positive-locking connection.

4. A plug-in lock in accordance with claim 1, wherein the plug-in part in the positive-locking connection has an area that is offset inwardly in relation to the receiving part for providing at least one of a depression and an area offset outwardly for providing a raised area.

5. A plug-in lock in accordance with claim 1, wherein the securing means has at least one of an elastically and spring mounted first locking element cooperating with a rigid second locking element corresponding to the first locking element, wherein the first locking element is associated with the plug-in part and the second locking element is associated with the receiving part.

6. A plug-in lock in accordance with claim 1, wherein at least one of the plug-in part and the actuating mechanism has at least one elastically mounted actuating element defining a pressing surface, for detaching the securing means, whereby the actuating element is connected to the first locking element for detaching the securing means.

7. A plug-in lock in accordance with claim 1, wherein a ramp is associated with one of the first locking element and the second locking element for leading the first locking element into a position for establishing the securing means as a locking connection.

8. A plug-in lock in accordance with claim 1, wherein the second positive-locking element comprises a second positive-locking rigid axial element, the first positive-locking rigid axial element comprising a plurality of notches, each of said notches extending continuously, without interruption, from one end of said first positive-locking rigid axial element to another end of said first positive-locking rigid axial element, each of said notches being located at a spaced location from another one of said notches, each of said notches being perpendicular to a longitudinal axis of the plug-in part, said second positive-locking rigid axial element comprising a plurality of projections, said plurality of projections defining at least a portion of a first positive-locking rigid axial element opening, the first positive-locking rigid axial element being arranged in said first positive-locking rigid axial element opening, each of said plurality of projections extending continuously, without interruption, from one end of said second positive-locking rigid axial element to another end of said second positive-locking rigid element, each of said projections being perpendicular to a longitudinal axis of the receiving part, each of said projections being located at a spaced location from another one of said projections, wherein each of said projections interacts with one of said notches to positively-lock said plug-in part to said receiving part.

9. An animal tether with a plug-in lock combination comprising:
a plug-in lock comprising a plug-in part, a receiving part, the plug-in part and the receiving part forming a positive-locking connection for transmitting a tensile force, a securing means separate from the positive-locking connection for preventing an unintentional detaching of the plug-in part and the receiving part to disconnect the positive-locking connection, whereby the securing means has an actuating mechanism for detaching the securing means, the plug-in part comprising a first positive-locking element and the receiving part comprising a second positive-locking element to provide two rigid positive-locking elements corresponding to one another;
a leash with a first end of the leash associated with a holding means for holding the leash and a second end of the leash, facing away from the first end of the leash, associated with the plug-in part; and
a fastening element arranged within the plug-in part, the second end of the leash being fastened to the fastening element, whereby the fastening element is fastened in a fastening mount associated with the first positive-locking element for covering the fastening of the second end of the leash, wherein the first positive-locking element comprises a first positive-locking rigid axial element, the first positive-locking rigid axial element comprising an opening, the fastening element, the second end of the leash and at least a portion of the fastening mount being arranged in the opening, whereby the fastening element is arranged within the first positive-locking element.

10. An animal tether with a plug-in lock combination according to claim 9, wherein one of a bite belt and a collar loop is associated with the receiving part at an end facing away from the plug-in part.

11. A plug-in lock in accordance with claim 10, wherein the second positive-locking element comprises a second positive-locking rigid axial element, the first positive-locking rigid axial element comprising a plurality of notches, each of said notches extending continuously, without interruption, from one end of said first positive-locking rigid axial element to another end of said first positive-locking rigid axial element, each of said notches being located at a spaced location from another one of said notches, each of said notches being perpendicular to a longitudinal axis of the plug-in part, said second positive-locking rigid axial element comprising a plurality of projections, said plurality of projections defining at least a portion of a first positive-locking rigid axial element opening, the first positive-locking rigid axial element being arranged in said first positive-locking rigid axial element opening, each of said plurality of projections extending continuously, without interruption, from one end of said second positive-locking rigid axial element to another end of said second positive-locking rigid element, each of said projections being perpendicular to a longitudinal axis of the receiving part, each of said projections being located at a spaced location from another one of said projections, wherein each of said projections interacts with one of said notches to positively-lock said plug-in part to said receiving part.

12. An animal tether plug-in lock comprising:
a plug-in part;
a receiving part, the plug-in part and the receiving part including cooperating portions to form a positive-locking connection for transmitting a tensile force, the cooperating portions comprising a first positive-locking element and a second positive-locking element to provide two rigid positive-locking elements corresponding to one another, the plug-in part comprising the first positive-locking element and the receiving part comprising the second positive locking element;
a securing device separate from the positive-locking connection, the securing device including a securing state with the securing device acting between the plug-in part and the receiving part to prevent the plug-in part from being disconnected from the receiving part and a release state releasing the plug-in part and the receiving part to allow the plug-in part to be disconnected from the receiving part, the securing device further comprising an actuating mechanism for changing the securing device from the securing state to the release state; and
a fastening element arranged within the plug-in part for fastening an end of a line element, whereby the fastening element is fastened in a fastening mount associated with the first positive-locking element for covering the fastening of the end of the line element, wherein the first positive-locking element comprises a first positive-locking rigid axial element, the first positive-locking rigid axial element comprising an opening, the fastening element, the end of the line element and at least a portion of the fastening mount being arranged in the opening, whereby the fastening element is arranged within the first positive-locking element.

13. A plug-in lock in accordance with claim 12, wherein at least one of the securing device and the positive-locking connection is established by an at least partial sliding of the plug-in part into the receiving part.

14. A plug-in lock in accordance with claim 13, wherein the second positive-locking element comprises a second positive-locking rigid axial element, the first positive-locking rigid axial element comprising a plurality of notches, each of said notches extending continuously, without interruption, from one end of said first positive-locking rigid axial element to another end of said first positive-locking rigid axial element, each of said notches being located at a spaced location from another one of said notches, each of said notches being perpendicular to a longitudinal axis of the plug-in part, said second positive-locking rigid axial element comprising a plurality of projections, said plurality of projections defining at least a portion of a first positive-locking rigid axial element opening, the first positive-locking rigid axial element being arranged in said first positive-locking rigid axial element opening, each of said plurality of projections extending continuously, without interruption, from one end of said second positive-locking rigid axial element to another end of said second positive-locking rigid element, each of said projections being perpendicular to a longitudinal axis of the receiving part, each of said projections being located at a spaced location from another one of said projections, wherein each of said projections interacts with one of said notches to positively-lock said plug-in part to said receiving part.

15. A plug-in lock in accordance with claim 12, wherein the plug-in part and the receiving part have at least one of a self-centering and self-securing design under a tensile load.

16. A plug-in lock in accordance with claim 12, wherein the plug-in part in the positive-locking connection has an area that is offset inwardly in relation to the receiving part for providing at least one of a depression and an area offset outwardly for providing a raised area.

17. A plug-in lock in accordance with claim 12, wherein the securing device has at least one of an elastically and spring mounted first locking element cooperating with one of the plug-in part and the receiving part and a rigid second locking element that is complementary to the first locking element, wherein the first locking element is associated with the plug-in part and the second locking element is associated with the receiving part.

18. A plug-in lock in accordance with claim 12, wherein at least one of the plug-in part and the actuating mechanism has at least one elastically mounted actuating element defining a pressing surface, for detaching the securing device, whereby the actuating element is connected to the first locking element for detaching the securing device.

19. A plug-in lock in accordance with claim 12, wherein a ramp is associated with one of the first locking element and the second locking element for leading the first locking element into a position for establishing the securing device as a locking connection.

* * * * *